(12) United States Patent
Maurer

(10) Patent No.: US 7,623,706 B1
(45) Date of Patent: Nov. 24, 2009

(54) REDUCTION OF CHROMATIC BLEEDING ARTIFACTS IN IMAGES CONTAINING SUBSAMPLED CHROMINANCE VALUES

(75) Inventor: Ron P. Maurer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 373 days.

(21) Appl. No.: 09/676,866

(22) Filed: Sep. 29, 2000

(51) Int. Cl.
*G06K 9/00* (2006.01)
*G06K 9/40* (2006.01)

(52) U.S. Cl. ...................................... 382/167; 382/275

(58) Field of Classification Search ......... 382/162–167, 382/199–203, 260–275, 300, 254, 299–298; 358/500–540, 1.9, 3.26–3.27; 345/589–613; 348/620–631, 221.1–229.1
See application file for complete search history.

(56) References Cited

U.S. PATENT DOCUMENTS

| | | | | |
|---|---|---|---|---|
| 5,373,327 A * | 12/1994 | McGee et al. | ................ | 348/645 |
| 5,418,574 A * | 5/1995 | Miyabata et al. | ............ | 348/625 |
| 5,537,228 A * | 7/1996 | Dillinger | ..................... | 358/502 |
| 5,555,106 A * | 9/1996 | Hsu | ............................ | 358/512 |
| 5,572,635 A * | 11/1996 | Takizawa et al. | ............ | 345/426 |
| 5,638,138 A * | 6/1997 | Hickman | ..................... | 348/678 |
| 5,742,410 A * | 4/1998 | Suzuki | ........................ | 358/518 |
| 5,987,169 A | 11/1999 | Daly et al. | | |
| 6,031,581 A | 2/2000 | Harrington | | |
| 6,198,841 B1 * | 3/2001 | Toyama et al. | .............. | 382/167 |
| 6,236,754 B1 * | 5/2001 | Harrington | .................. | 382/199 |

FOREIGN PATENT DOCUMENTS

EP 0929189 A2 7/1999

OTHER PUBLICATIONS

Daly et al., Improving Color Text Sharpness in Images with Reduced Chromatic Bandwidth, IS&T's 1998 PICS Conference (pp. 386-390).
Barry G. Haskell; "IEEE Transactions on Circuits and Systems for Video Technology"; Image and Video Coding—Emerging Standards and Beyond, vol. 8, No. 7; Nov. 1998; pp. 814-836.
Michael Yuen; "Signal Processing"; A Survey of Hybrid MC/DPCM/DCT Video Coding Distortions; Jul. 30, 1998; pp. 247-278.

\* cited by examiner

*Primary Examiner*—Sherali Ishrat

(57) ABSTRACT

Chromatic bleeding artifacts in a digital image are reduced by modifying chrominance values of at least some pixels in the digital image. The chrominance values are modified according to luminance values and chromatic dynamic range.

40 Claims, 3 Drawing Sheets

FIG. 3a FIG. 3b FIG. 3c FIG. 3d $C_m = \min(C1, C2, C3, C4); C_M = \max(C1, C2, C3, C4)$

REDUCTION OF CHROMATIC BLEEDING ARTIFACTS IN IMAGES CONTAINING SUBSAMPLED CHROMINANCE VALUES

BACKGROUND OF THE INVENTION

The present invention relates to digital images. More specifically, the present invention relates to the reconstruction of compressed images.

Image compression according to JPEG and certain other image compression algorithms is performed by converting images to luminance and chrominance channels and subsampling the chrominance channels (Cb and Cr) by an integer factor (usually 2 or 4). The luminance and subsampled chrominance channels are then compressed by a compression module suitable for grayscale image. The chrominance channels may be subsampled because the human visual system (HVS) has a reduced spatial sensitivity of chromatic sensation relative to luminance sensation by roughly a factor of two. Consequently, chromatic bleeding artifacts resulting from the sub-sampling are virtually unnoticeable in most color photographs that contain subsampled chrominance values.

However, chromatic bleeding artifacts are noticeable in color compound document images, which frequently contain sharp edges between different colors. For example, a color compound document might have text or other computer-generated shapes that are overlaid on regions having uniform color. The sharp edges occur at the transitions of the computer-generated images and the photographs.

The chromatic bleeding artifacts are noticeable if the reconstructed chrominance-channels are interpolated back to their original resolution by a simple technique such as linear interpolation. The chromatic bleeding artifacts are seen at boundaries between regions with saturated colors and white regions (or regions with bright colors). In document images, these boundaries are often between a white or bright background and color characters, lines and patches.

The chromatic bleeding artifacts are also noticeable in regions containing inverted text (e.g., white characters on a colored background). Due to the properties of the human visual system, the chromatic bleeding artifacts are visible on the brighter side of the edge.

The chromatic bleeding artifacts reduce image quality. Therefore, it would be desirable to reduce the chromatic bleeding artifacts, especially in color compound document images.

SUMMARY OF THE INVENTION

According to one aspect of the present invention, chromatic bleeding artifacts in a digital image are reduced by modifying chrominance values of at least some pixels in the digital image. The pixels are modified according to luminance values and chromatic dynamic range.

Other aspects and advantages of the present invention will become apparent from the following detailed description, taken in conjunction with the accompanying drawings, illustrating by way of example the principles of the present invention.

BRIEF DESCRIPTION OF THE DRAWINGS

Figures 3A, 3B, 3C, 3D:
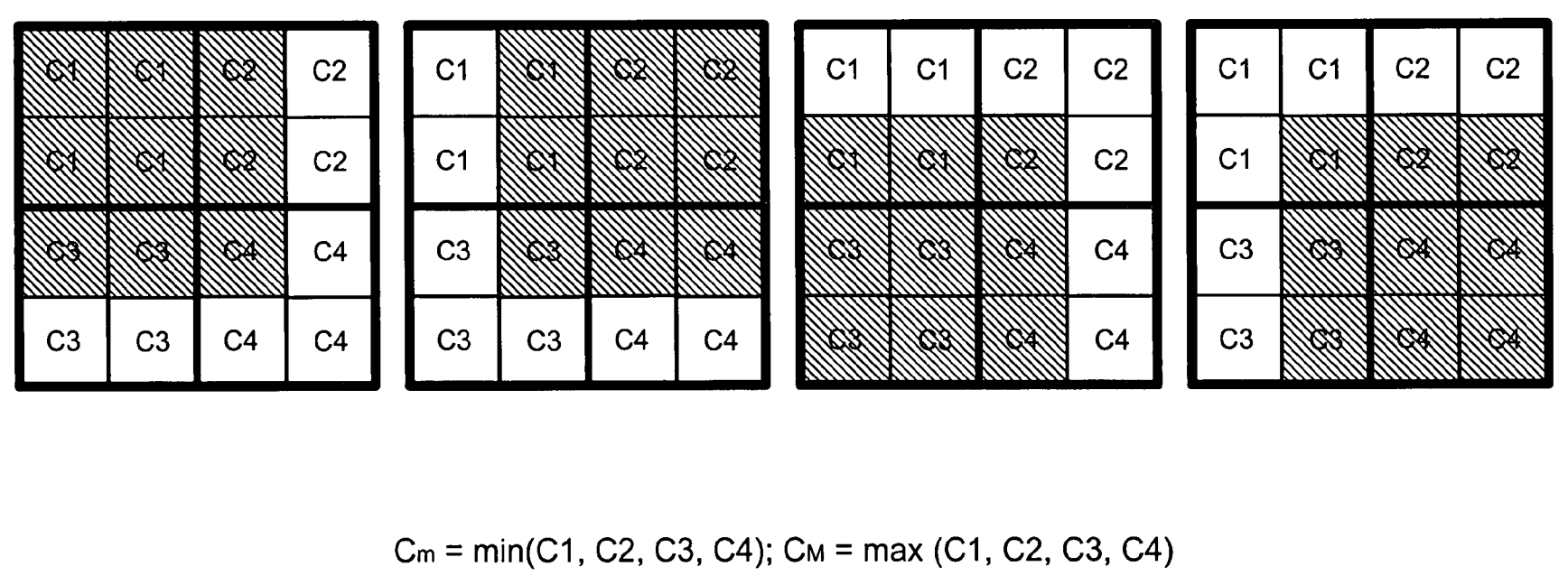

FIGS. 3(a) to 3(d) are illustrations of a sliding window for determining chromatic dynamic ranges of pixels in a reconstructed image that has been interpolated by pixel replication.

DETAILED DESCRIPTION OF THE INVENTION

Figure 1:
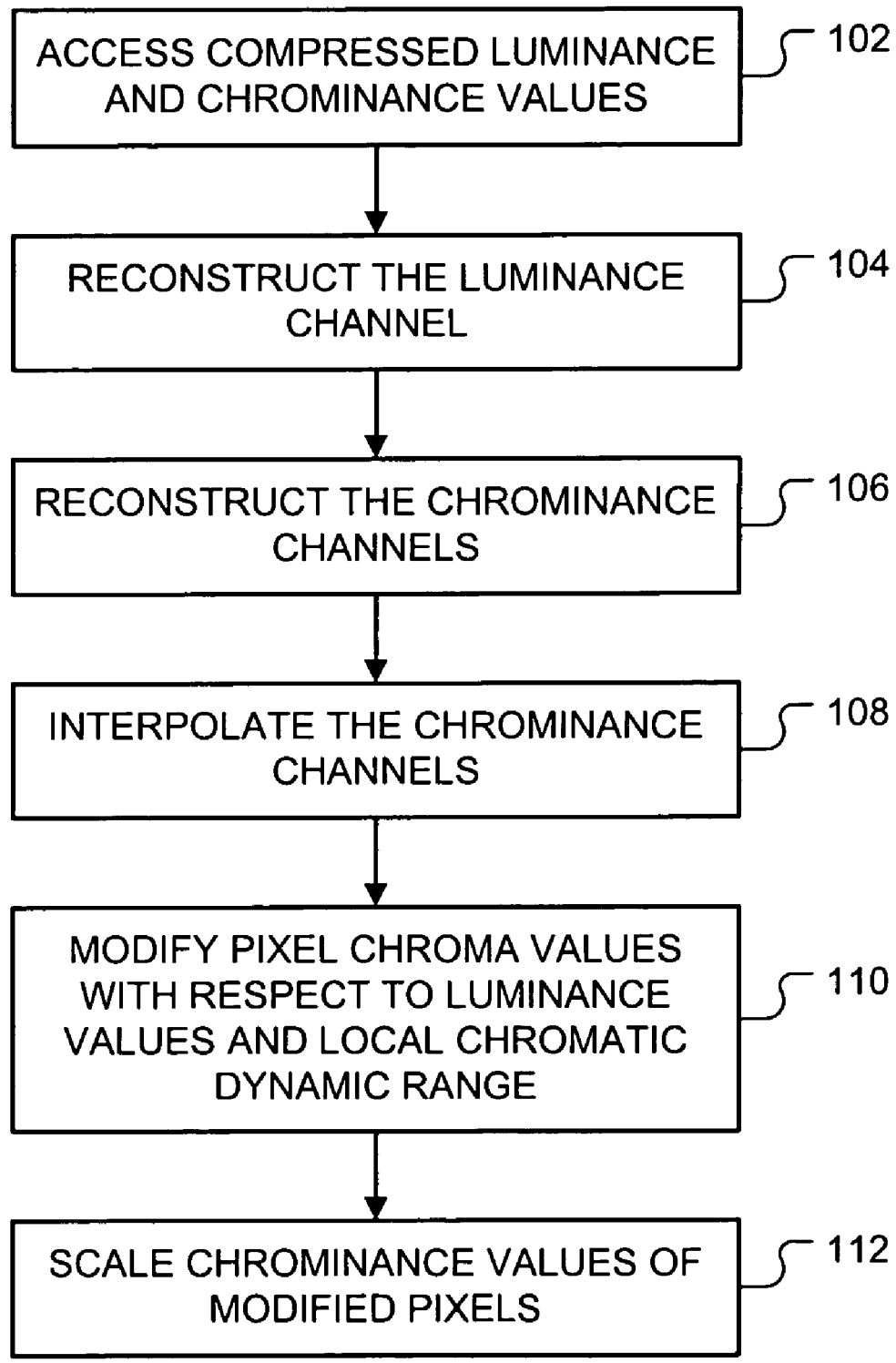
FIG. 1 is an illustration of a method of reconstructing an image and reducing chromatic bleeding artifacts in the reconstructed image.

As shown in the drawings for purposes of illustration, the present invention is embodied in a method and apparatus for reducing chromatic bleeding artifacts in digital images containing subsampled chrominance values. The method and apparatus are particularly suited for reducing chromatic bleeding artifacts in color compound document images containing both natural and computer-generated features. Natural features in photo regions tend to have mild luminance or chrominance transitions. Computer-generated features such as text regions tend to have sharp edges and sharp luminance or chrominance transitions. The method and apparatus reduce the chromatic bleeding artifacts that occur at the sharp edges.

Reference is made to FIG. 1, which illustrates a method of reconstructing a compressed image and reducing chromatic bleeding artifacts in the reconstructed image. The compressed image includes a first stream of compressed luminance (Y) values and second and third streams of compressed chrominance (Cb and Cr) values. Prior to compression, the chrominance channels were either subsampled or low-pass filtered and then subsampled.

The image reconstruction begins by accessing the first, second and third streams of compressed values (block 102). The luminance values (Y) are reconstructed from the first stream (block 104) and the chrominance values (Cb and Cr) are reconstructed from the second and third streams (block 106).

The luminance and chrominance values will hereinafter be described with respect to normalized values. For the luminance values, $0 \leq Y \leq 1$. For the chrominance values, $-0.5 \leq Cb \leq 0.5$ and $-0.5 \leq Cr \leq -0.5$. The point Cb=Cr=0 corresponds to the gray-axis (no color).

Since the chrominance values (Cb and Cr) were subsampled during compression, the reconstructed chrominance channels are interpolated or upsampled to their original resolution to match the resolution of the luminance channel (block 108). A simple interpolation method is pixel replication, where every low-resolution pixel is replaced by a 2×2 block of high-resolution pixels having the same chrominance values (Cb and Cr). A more sophisticated upsampling method involves applying low-pass filtering on the pixel-replicated chrominance channels for reducing aliasing artifacts in locations of high spatial frequency, such as edges.

Chromatic bleeding artifacts in the reconstructed digital image are reduced by modifying chroma values of at least some of the pixels in the digital image. The chroma value of a pixel is modified with respect to the pixel's luminance value and local chromatic dynamic range (block 110); and the chrominance values (Cb and Cr) are scaled according to the change in chroma value (block 112). Modifying the chroma value with respect to chromatic dynamic range is performed so as not to reduce chromaticity too much in regions with essentially uniform light colors.

The reconstructed luminance and chrominance channels may be converted back to RGB space at the original resolution. The reconstructed image may then be displayed (e.g., printed).

Figure 2:
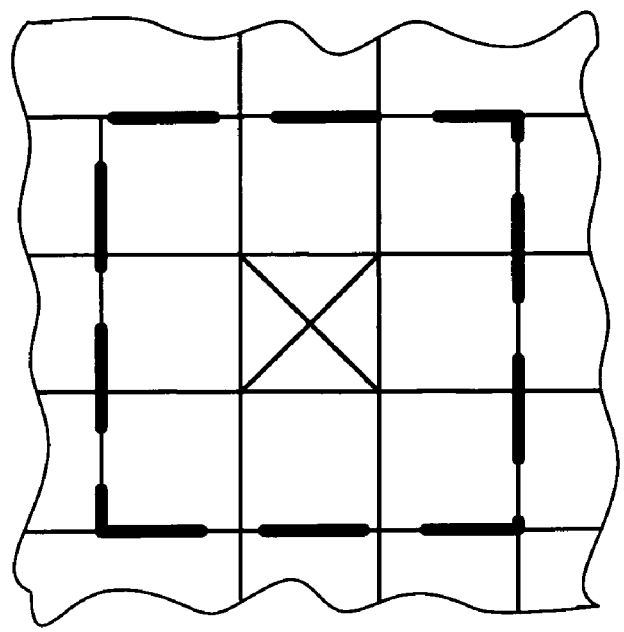
FIG. 2 is an illustration of a local neighborhood of pixels.

The local chromatic dynamic range of a pixel is determined with respect to its local pixel neighborhood. FIG. 2 provides an example of a neighborhood of pixels. The neighborhood, delineated by a window indicated in dashed lines, includes a 3×3 array of pixels. The pixel of interest, marked by an "X," lies at the center of the neighborhood.

The chromatic dynamic range for each pixel of interest may be computed as the difference between minimum and maximum chroma values of the pixels in the local neighborhood. The chroma value (C) of a pixel may be computed as $C=\sqrt{C_b^2+C_r^2}$ or the chroma value (C) may be approximated by $C \approx |C_b|+|C_r|$ where the allowed value range for each of the chrominance values is [−0.5,0.5]. The chromatic dynamic range of a neighborhood may be computed as $D=C_M-C_m$ where $C_m$ represents the minimum chroma value of the neighborhood and $C_M$ represents the maximum chroma value of the neighborhood.

A neighborhood and chromatic dynamic range are determined for each pixel of interest. Consequently, the chromatic dynamic range is determined on a pixel-by-pixel basis.

A new chroma value (C') for a pixel of interest may be computed as $C'=C-f(Y,D)\cdot(C-C_0)$, where C is the original chroma value for the pixel, D is the chromatic dynamic range, $C_0$ is a chromatic modulus having a value between zero and the minimum chroma of the local neighborhood for the pixel, and f(Y,D) is a parametric expression that determines the amount of relative chroma reduction.

The parametric expression f(Y,D) may range between 0 and 1. The parametric expression f(Y,D) complies with the following constraints: (1) f(Y,D)→1 for Y→1, whereby C'→$C_0$; and (2) f(Y,D)→0 for D→0. If D→0, then C'→C, whereby the chroma value for the pixel is not modified.

The parametric expression f(Y,D) may also comply with another constraint: f(Y,D)→0 for D→0 and Y→1. Thus, the chromatic dynamic range takes precedence.

If the chroma value is modified, each corresponding chrominance value (Cb and Cr) is scaled by the ratio C'/C. Thus, $$Cb' = \frac{C'}{C}Cb$$

and $$Cr' = \frac{C'}{C}Cr.$$

This keeps the hue of the color unchanged.

Consider different cases for the chromatic modulus ($C_0$). In a first case $C_0=C_m$, whereby $C'=C-f(Y,D)\cdot(C-C_m)$ and the new chroma value (C') lies between the original chroma value (C) and the neighborhood minimum ($C_m$). For high luminance Y→1, the new chroma value (C') approaches the local minimum ($C_m$). Thus C'→$C_m$ as Y→1.

In a second case, $C_0$=max ($C_m$−D, 0). Such a modulus $C_0$ allows the new chroma value (C') to fall below the local minimum ($C_m$). However, the chroma value is still dependent upon the chromatic dynamic range (D). The chromatic modulus ($C_0$) is not reduced below $C_m$−D. If $C_m$<D, the chromatic modulus ($C_0$) becomes zero. For chromatic dynamic ranges that are not small, the situation $C_m$<D corresponds to edges between "non-colored" and "saturated color" regions. In this situation, the chroma value may be reduced to zero if the "non-colored" side is close to white. On the other hand, the situation $C_m$>D could correspond to an edge between a "mild-color" and a "saturated-color" where the visibility of color-bleeding artifacts is not high to start with. In this situation, allowing the chroma value to be reduced to zero would reduce too much color in the lighter side of the edge. Putting a lower bound $C_m$−D on the modified chroma value ensures that in color gradient regions ("mild edges") where the chromatic dynamic range (D) is neither very small or very large, the chroma value will not be reduced significantly when the luminance Y→1.

In the third case, $C_0$=0. For high luminance Y→1, the new chroma value (C') approaches 0. Thus C'→0 as Y→1.

The parametric expression may be expressed in different ways. An exemplary parametric expression is $$f(Y, D) = \max\left[1 - \alpha\left(\frac{1-Y}{D}\right), 0\right].$$

The exemplary parametric expression always complies with the two constraints: f(Y→1,D)→1 and f(Y,D→0)→0, regardless of the value of the term α (where α is positive).

For a given value of D, there is a luminance value (Y) below which the chromatic bleeding artifacts are not visible. If a chromatic bleeding artifact is not visible for a given D, the value of the term α may be chosen such that f(Y,D)=0. For example, the chroma value is not modified if Y<(1−D/α). That is, C'=C if Y<$T_Y$(D), where threshold $T_Y$(D)=(1−D/α).

The term α may be a function of the chromatic dynamic range (D). A term α may be measured for each value of D. Each term α may be measured from subjective tests (e.g., observing visibility of artifacts in patches).

In the alternative, the term α may be constant for all D. The value for the term α can be determined by trial and error. For example, 0.5≦α≦1 has been found to work well.

Thus disclosed is a method for reducing the chrominance magnitude in pixels that would generate a visual perception of chromatic bleeding. By taking luminance and local chrominance values into account, the method does not modify patches that have high luminance values and non-negligible chrominance values. A flat region might have relatively high luminance but also non-negligible chrominance. The method would not map such a region to white. A document image might have text boxes with light colored backgrounds. The method would not map the light backgrounds to white.

The method is particularly useful for reducing chromatic bleeding artifacts in compound color documents. However, the method is not so limited.

Although FIG. 2 shows a 3×3 square-shaped neighborhood, the method is not limited to such a neighborhood. The neighborhood is not limited to any particular size. The number of pixels is not limited to nine. Although a fixed number of pixels in the neighborhood is preferred for all pixels of interest, the size of the neighborhood may be changed dynamically to accommodate a particular class of image region (e.g., text, graphics, natural features).

The neighborhood is not limited to any particular geometry, although square windows are preferred for performance reasons. For example, the shape of the neighborhood may be diamond-shaped. The minimum/maximum calculations may include the center pixel (that is, a full neighborhood may be used) or the minimum/maximum calculations may exclude the center pixel of interest (that is, a hollow neighborhood may be used).

The method has been described in connection with decomposing a digital image into visually significant channels (e.g., luminance and blue and red chrominance channels). However, the method is not limited to YCbCr color space. For example, the method may be applied in Yuv, Luv or Lab color space (where L represents luminosity).

In the method described above, much of the computational effort is devoted towards computing the chromatic dynamic range for each pixel in a neighborhood. However, the computational effort can be reduced, and the speed of the method increased, by using subsampled chrominance values and thus taking advantage of redundancy.

Reference is now made to FIGS. 3(a) to 3(d), which show a sliding window for determining chromatic dynamic ranges of pixels in a reconstructed image that has been interpolated by pixel replication. During the interpolation, a first pixel in the reconstructed luminance channel is replaced by a 2×2 block of pixels C1, a second pixel in the reconstructed luminance channel is replaced by a 2×2 block of pixels C2, a third pixel in the reconstructed luminance channel is replaced by a 2×2 block of pixels C3, and a fourth pixel in the reconstructed luminance channel is replaced by a 2×2 block of pixels C4.

The pixels in every 2×2 block in the upsampled chrominance channels contain exactly the same chrominance value. As FIGS. 3(a) to 3(d) show, each 4×4 block in the upsampled chrominance channel which is aligned with 2×2 block boundaries, has four possibilities of accommodating 3×3 neighborhoods. For each of these four possibilities, the neighborhood minimum (or maximum), and the chromatic dynamic range of the neighborhoods are the same, since they are calculated from the same four chromatic modulus values. The four chromatic modulus values correspond to the four double-sized pixels, where each such pixel corresponds to a pixel in the sub-sampled chrominance channels. Thus, the computational complexity is reduced to finding the maximum and minimum in 2×2 neighborhoods in the subsampled chrominance channels. This reduces by a factor of four the number of chrominance modulus calculations, and reduces by a factor of sixteen the number of comparisons needed for calculating the minimum and maximum chroma values ($C_m$ and $C_M$) of the neighborhoods. If pixel-replication is to be used in this manner, it is preferable to apply low-pass filtering on the chrominance channels prior to their subsampling. For example, every 2×2 block of the original chrominance channels could be replaced by the average or the median of the four chrominance-values in that block.

The computational effort may be reduced in other ways. For example, if the difference between the new chroma value (C') and the original chroma value (C) is imperceptible, little will be gained by modifying the chroma value. Therefore, the parametric expression is not computed and the chroma value is not modified if the difference is imperceptible. For example, C'=C if $(C-C_0)<T$, where T is a predetermined threshold. If the chromatic dynamic range (D) is computed with a fast recursive algorithm, it is calculated for all pixels. Therefore, little overhead is incurred by performing the comparison D<T. An exemplary threshold is T=0.1 (for normalized chrominance values).

The method may be implemented in hardware, software or a combination of the two.

Figure 4:
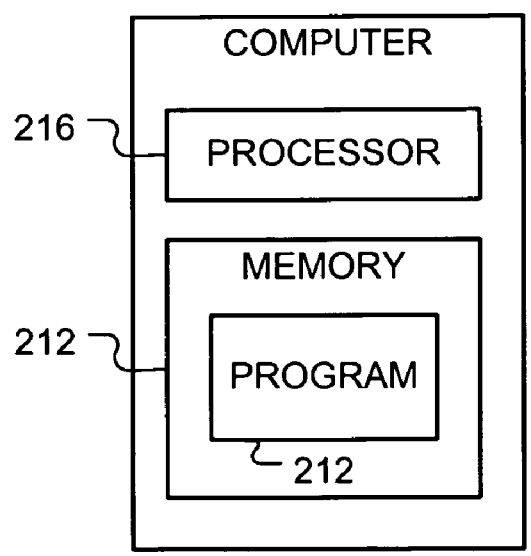
FIG. 4 is an illustration of a hardware implementation of the method of FIG. 1.

Reference is now made to FIG. 4, which illustrates a software implementation of the method. Computer memory 212 stores a program 214 that, when executed, instructs a processor 216 to perform the method described above. The memory 212 and the processor 216 may be part of a personal computer or workstation.

A non-recursive algorithm may be used to determine the minimum and maximum chroma values of pixel neighborhoods. The non-recursive algorithm may be used for all types of neighborhoods. The size of the memory needed to determine the minimum and maximum values is equal to the size of the neighborhood.

A fast recursive algorithm may be used to determine the minimum and maximum chroma values of full square neighborhoods (e.g., 2×2 neighborhoods, 3×3 neighborhoods, 5×5 neighborhoods). Except for the 2×2 neighborhood, only twelve comparisons are needed to determine the maximum and minimum chroma values of a neighborhood, regardless of the size of the neighborhood. In the case of the 2×2 neighborhood, only three comparisons are needed. If this recursive algorithm is used, the size of memory needed to buffer the lines is equal to twice the size of the lateral kernel window.

The present invention is not limited to the specific embodiments described and illustrated above. Instead, the invention is construed according to the claims that follow.

What is claimed is:

1. A method of reducing chromatic bleeding artifacts in a digital image, the method comprising reducing chrominance values of at least some pixels in the digital image, the chrominance value of a pixel reduced by an amount that is scaled according to its chromatic dynamic range, wherein the chrominance values of a pixel are scaled by the ratio C'/C if the original chroma value (C) of the pixel is modified, where C' is the new chroma value.

2. A method of reducing chromatic bleeding artifacts in a digital image, the method comprising reducing chrominance values of at least some pixels in the digital image, the chrominance value of a pixel reduced by an amount that is scaled according to its chromatic dynamic range, wherein the amount is $C-C_0$, where C is the original chroma value of the pixel, and $C_0$ is a chromatic modulus derived from a local neighborhood.

3. A method of reducing chromatic bleeding artifacts in a digital image, the method comprising modifying chrominance values of at least some pixels in the digital image, the pixels being modified according to their luminance values and chromatic dynamic ranges by $C'=C-f(Y,D)\cdot(C-C_0)$, where C' is the new chroma value of the pixel, C is the original chroma value of the pixel, Y is the luminance of the pixel, D is the chromatic dynamic range, $C_0$ is a chromatic modulus having a value between zero and $C_m$, $C_m$ is the minimum chroma of the local neighborhood for the pixel, and f(Y,D) is a parametric expression that determines the amount of relative chroma reduction.

4. The method of claim 3, wherein f(Y,D) complies with $f(Y,D) \to 1$ for $Y \to 1$; and $f(Y,D) \to 0$ for $D \to 0$.

5. The method of claim 4, wherein f(Y,D) also complies with $f(Y,D) \to 0$ for $D \to 0$ and $Y \to 1$.

6. The method of claim 3, wherein $C_0 = \max[C_m - D, 0]$.

7. The method of claim 3, wherein the modulus $C_0 = C_m$.

8. The method of claim 3, wherein $C_0 = 0$.

9. The method of claim 3, wherein $$f(Y, D) = \max\left[1 - a\left(\frac{1-Y}{D}\right), 0\right],$$

where $\alpha$ is a positive term.

10. The method of claim 9, wherein C'=C if $Y<(1-D/\alpha)$.

11. A method of reducing chromatic bleeding artifacts in a digital image, the method comprising modifying chrominance values of at least some pixels in the digital image, the pixels being modified according to their chromatic dynamic ranges and luminance values, wherein each pixel of interest is mapped by:

determining a chromatic dynamic range;

leaving the pixel unmodified if the chromatic dynamic range is less than a predetermined threshold; and computing a parametric function if the chromatic dynamic range is greater than the threshold and using the parametric function to modify the chrominance value of the pixel, the parametric function being a function of the luminance and local chromatic dynamic range of the pixel.

12. A method of reducing chromatic bleeding artifacts in a digital image, the method comprising reducing chrominance values of at least some pixels in the digital image, the chrominance value of a pixel reduced by an amount that is scaled according to its chromatic dynamic range, wherein the digital image is reconstructed from subsampled chrominance values; and wherein the chromatic dynamic range is determined from subsampled chrominance values.

13. A method of reconstructing a digital image from a luminance channel and subsampled chrominance channels, the method comprising:
   interpolating the chrominance channels; and
   reducing chromatic bleeding artifacts from the interpolated chrominance channels by selectively reducing chrominance values of at least some pixels in the digital image, the pixels being selectively reduced by amounts that are scaled according to chromatic dynamic ranges; wherein no chrominance values in the digital image are increased according to chromatic dynamic ranges.

14. Apparatus for reducing chromatic bleeding artifacts in a digital image, the apparatus comprising a processor for selectively reducing chrominance values of pixels in the digital image, the chrominance values of the pixels reduced by amounts that are scaled according to chromatic dynamic ranges, wherein the chromatic dynamic range for each pixel is a function of minimum and maximum chroma values of a local pixel neighborhood, the processor determines local chromatic dynamic ranges on a pixel-by-pixel basis, and the processor scales the chrominance values of a pixel by the ratio C'/C if the original chroma value (C) of the pixel is modified, where C' is the new chroma value.

15. Apparatus for reducing chromatic bleeding artifacts in a digital image, the apparatus comprising a processor for modifying chrominance values of at least some pixels in the digital image, the pixels being modified by $C'=C-f(Y,D)\cdot(C-C_0)$, where C' is the new chroma value of the pixel, C is the unmodified chroma value of the pixel, Y is the luminance of the pixel, D is the local chromatic dynamic range, $C_0$ is a chromatic modulus having a value between zero and $C_m$, $C_m$ is the minimum chroma of the local neighborhood for the pixel, and f(Y,D) is a parametric expression that determines the amount of relative chroma reduction and that ranges between 0 and 1.

16. The apparatus of claim 15, wherein f(Y,D) complies with $f(Y,D) \to 1$ for $Y \to 1$; and $f(Y,D) \to 0$ for $D \to 0$.

17. The apparatus or claim 16, wherein f(Y,D) also complies with $f(Y,D) \to 0$ for $D \to 0$ and $Y \to 1$.

18. The apparatus of claim 15, wherein $C_0 = \max[C_m - D, 0]$.

19. The apparatus of claim 15, wherein the modulus $C_0 = C_m$.

20. The apparatus of claim 15, wherein $C_0 = 0$.

21. The apparatus of claim 15, wherein $$f(Y,D) = \max\left[1 - \alpha\left(\frac{1-Y}{D}\right), 0\right],$$

where α is a positive term.

22. The apparatus of claim 21, wherein C'=C if $Y<(1-D/\alpha)$.

23. Apparatus for reducing chromatic bleeding artifacts in a digital image, the apparatus comprising a processor for selectively reducing chrominance values of pixels in the digital image, the chrominance values of the pixels reduced by amounts that are scaled according to chromatic dynamic ranges, wherein the processor reconstructs the digital image from subsampled chrominance values; and wherein the processor determines the chromatic dynamic ranges from the subsampled chrominance values.

24. A method of reducing chromatic bleeding artifacts in a digital image, the method comprising reducing chrominance values of at least some pixels in the digital image, the chrominance value of a pixel reduced by an amount that is scaled according to its chromatic dynamic range, further comprising using a luminance value of a pixel being modified to determine an amount of chromatic reduction.

25. The method of claim 24, wherein a chroma value of a pixel is modified to no more than a chromatic modulus ($C_0$) if the pixel has a high luminance, and wherein the chroma value of a pixel is not modified if the pixel has a small dynamic range.

26. Apparatus for reducing chromatic bleeding artifacts in a digital image, the apparatus comprising a processor for selectively reducing chrominance values of pixels in the digital image, the chrominance values of the pixels reduced by amounts that are scaled according to chromatic dynamic ranges, further comprising using a luminance value of a pixel being modified to determine an amount of chromatic reduction.

27. Apparatus for reducing chromatic bleeding artifacts in a digital image, the apparatus comprising a processor for selectively reducing chrominance values of pixels in the digital image, the chrominance values of the pixels reduced by amounts that are scaled according to chromatic dynamic ranges, wherein a chroma value of a pixel is modified to no more than a chromatic modulus ($C_0$) if the pixel has a high luminance, and wherein the chroma value of a pixel is not modified if the pixel has a small dynamic range.

28. An article for a processor, the article comprising:
   computer memory; and
   a program stored in the memory, the program, when executed, causing the processor to reduce chromatic bleeding artifacts in a digital image by selectively reducing chrominance values of pixels in the digital image by amounts that are scaled according to chromatic dynamic ranges of the pixels, wherein the program further instructs the processor to use a luminance value of a pixel being modified to modify an amount of chromatic reduction.

29. An article for a processor, the article comprising memory encoded with instructions for instructing the processor to reduce chromatic bleeding artifacts in a digital image by modifying chrominance values of at least some pixels in the digital image, the pixels being modified by $C'=C-f(Y,D)\cdot(C-C_0)$, where C' is the new chroma value of the pixel, C is the unmodified chroma value of the pixel, Y is the luminance of the pixel, D is the local chromatic dynamic range, $C_0$ is a chromatic modulus having a value between zero and $C_m$, $C_m$ is the minimum chroma of the local neighborhood for the pixel, and f(Y,D) is a parametric expression that determines the amount of relative chroma reduction and that ranges between 0 and 1.

30. The article of claim 29, wherein f(Y,D) complies with $f(Y,D) \to 1$ for $Y \to 1$; and $f(Y,D) \to 0$ for $D \to 0$.

31. The article of claim 29, wherein f(Y,D) also complies with $f(Y,D) \to 0$ for $D \to 0$ and $Y \to 1$.

32. The article of claim 29, wherein $C_0 = \max[C_m - D, 0]$.

33. The article of claim 29, wherein the modulus $C_0 = C_m$.

34. The article of claim 29, wherein $C_0 = 0$.

35. The article of claim 29, wherein $$f(Y, D) = \max\left[1 - \alpha\left(\frac{1-Y}{D}\right), 0\right],$$

where $\alpha$ is a positive term.

36. The article of claim 35, wherein $C'=C$ if $Y<(1-D/\alpha)$.

37. A method of reducing chromatic bleeding artifacts in a digital image, the method comprising reducing chrominance values of at least some pixels in the digital image, the chrominance value of a pixel reduced by an amount that is scaled according to its chromatic dynamic range, wherein the amount is also scaled according to luminance of the pixel.

38. The method of claim 2, wherein $C_0=\max[C_m-D,0]$).

39. The method of claim 2, wherein the modulus $C_0=C_m$.

40. The method of claim 2, wherein $C_0=0$.

* * * * *

UNITED STATES PATENT AND TRADEMARK OFFICE
CERTIFICATE OF CORRECTION

PATENT NO. : 7,623,706 B1  Page 1 of 1
APPLICATION NO. : 09/676866
DATED : November 24, 2009
INVENTOR(S) : Ron Maurer It is certified that error appears in the above-identified patent and that said Letters Patent is hereby corrected as shown below:

In column 6, line 45, in Claim 6, delete "$C_0=\max[C_m-D,0])$." and insert -- $C_0=\max[C_m-D,0]$. --, therefor.

In column 7, lines 51-52, in Claim 18, delete "$C_0=\max[C_m-D,0])$." and insert -- $C_0=\max[C_m-D,0]$. --, therefor.

In column 8, line 65, in Claim 32, delete "$C_0=\max[C_m-D,0])$." and insert -- $C_0=\max[C_m-D,0]$. --, therefor.

In column 10, line 5, in Claim 38, delete "$C_0=\max[C_m-D,0])$." and insert -- $C_0=\max[C_m-D,0]$. --, therefor.

Signed and Sealed this

Sixth Day of April, 2010

David J. Kappos
*Director of the United States Patent and Trademark Office*